Jan. 19, 1960 A. A. LAHTI ET AL 2,921,753

TAPE TRANSPORT SYSTEM

Filed May 17, 1954 3 Sheets-Sheet 1

INVENTORS.
ARVO A. LAHTI
GUY E. INSHAW
FREDERICK S. McCORMICK
BY James B. Christie
ATTORNEY

FIG. 3.

(a)

SUPPLY REEL CONTROL

| INPUT COMMAND | FORWARD | NO TRANSP. | REVERSE |
|---|---|---|---|
| L + S' (LONG) | BRAKE SOFT | WIND FAST | WIND FAST |
| L' + S' | UNWIND SLOW | BRAKE HARD | WIND SLOW |
| L' + S (SHORT) | UNWIND FAST | UNWIND FAST | BRAKE SOFT |
| | OUTPUT COMMAND | | |

(b)

TAKE-UP REEL CONTROL

| INPUT COMMAND | FORWARD | NO TRANSP. | REVERSE |
|---|---|---|---|
| L + S' (LONG) | WIND FAST | WIND FAST | BRAKE SOFT |
| L' + S' | WIND SLOW | BRAKE HARD | UNWIND SLOW |
| L' + S (SHORT) | BRAKE SOFT | UNWIND FAST | UNWIND FAST |
| | OUTPUT COMMAND | | |

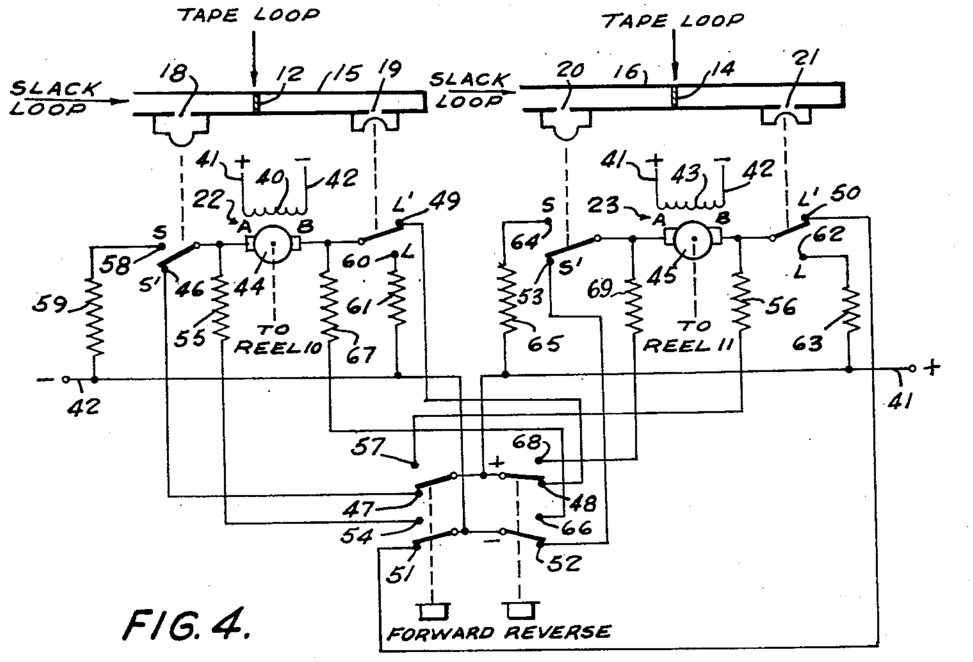
FIG. 4.

INVENTORS.
ARVO A. LAHTI
GUY E. INSHAW
FREDERICK S. McCORMICK
BY James B. Christie
ATTORNEY Jan. 19, 1960

A. A. LAHTI ET AL 2,921,753

TAPE TRANSPORT SYSTEM

Filed May 17, 1954

3 Sheets-Sheet 3

INVENTORS.
ARVO A. LAHTI
GUY E. INSHAW
FREDERICK S. McCORMICK

BY James B. Christie

ATTORNEY

United States Patent Office 2,921,753

Patented Jan. 19, 1960

2,921,753

TAPE TRANSPORT SYSTEM

Arvo A. Lahti, Pasadena, Guy E. Inshaw, Sierra Madre, and Frederick S. McCormick, Arcadia, Calif., assignors, by mesne assignments, to Consolidated Electrodynamics Corporation, Pasadena, Calif., a corporation of California Application May 17, 1954, Serial No. 430,334

3 Claims. (Cl. 242—55.12)

The present invention relates to tape transport systems, and more particularly, to improved apparatus for controlling the movement of a strip of material from a first station to a second station through a critical zone in which a predetermined rate of transport is to be maintained.

Where a strip of material of substantial length is to be transported past an operational station, it is necessary to control the rate at which the strip is supplied to the operational station and the rate at which the strip is taken from the operational station. For example, in magnetic tape recording systems, a strip of magnetizable tape is fed from a supply reel to a take-up reel via an operational zone in which are located magnetic recording and reading heads.

For some uses, such as memory systems in digital computers, it is necessary to scan quickly the length of the magnetic tape to derive selected information recorded at a particular location. This means that the apparatus for transporting the tape must be quickly responsive to rapid acceleration and deceleration, and be capable of quickly reversing the direction of tape transport. Due to the inertia of the reeling system, such accelerations, decelerations and reversals are apt to break the tape. For this reason it has been proposed that slack loops be interposed between the supply reel and the operational zone, and between the operational zone and the take-up reel. By this means, the direction of tape transport, or the rate at which the tape is passing the operational zone, may be quickly changed with a corresponding change by the supply and take-up reels taking place at a slower rate.

Where slack loops are employed in a tape transport system, some means must be provided for controlling the rate at which the supply reel unwinds the tape, and the rate at which the take-up reel winds the tape, to keep the slack loops at an optimum length.

One known method is to hold each of the slack loops in position in a separate vacuum column which is slightly evacuated below the tape. Various methods for sensing the length of the slack loops and controlling the reels have been employed, but all of the known methods have involved control systems which were either insensitive to quick variation in slack loop length, or included cumbersome clutches to control the speed of the reels.

In accordance with our invention, a simple method for sensing the length of the slack loops and controlling the speed of rotation of the supply reel and take-up reel is provided which does not require clutches. The system has been found to be simple of construction and reliable in operation, to a degree not found in any previously known apparatus.

Briefly, the invention includes means for sensing each of the slack loops to determine whether it is of a length within two predetermined limits. When the loop is within the two predetermined limits, the reels are driven at a rate corresponding to the rate at which the tape passes through the operational zone. When the slack loop adjacent to the supply reel is found to be shorter than one of the predetermined limits, the supply reel is driven faster, and when the slack loop adjacent to the supply reel is found to be longer than the other of the predetermined limits, the supply reel is braked.

With respect to the take-up reel, when the slack loop adjacent to it is found to be longer than the longer of the predetermined limits, the take-up reel is driven faster, while if the slack loop is found to be shorter than the shorter of the predetermined limits, the take-up reel is braked.

In a particular embodiment of the invention, the apparatus is arranged so that when the tape is passing from the take-up reel to the supply reel, rather than from the supply reel to the take-up reel, the effect upon the speed of rotation of the reels is reversed from the above in accordance with the length of the slack loops. That is, when the slack loop adjacent to the supply reel is longer than the longer of the predetermined limits, the supply reel is driven faster, while if the supply reel slack loop is shorter than the shorter of the predetermined limits, the supply reel is braked. In contrast, when the slack loop adjacent to the take-up reel is longer than the longer of the predetermined limits, the take-up reel is braked, and when the slack loop adjacent to the take-up reel is shorter than the shorter of the predetermined limits, the take-up reel is driven faster. A better understanding of the present invention and its advantages may be had upon a reading of the following detailed description when taken in connection with the drawings, in which:

Fig. 3 is a diagram showing the relationship of the lengths of the slack loops to the resultant action of the reels of Fig. 1;

Fig. 4 is a schematic circuit diagram of one form of motor control circuitry;

Figure 5:
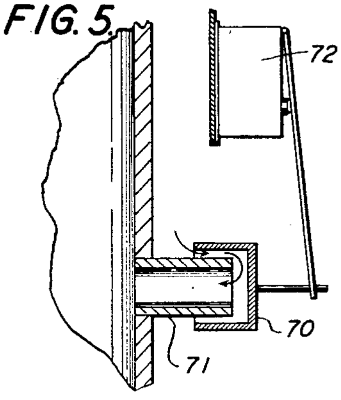
Figure 6:
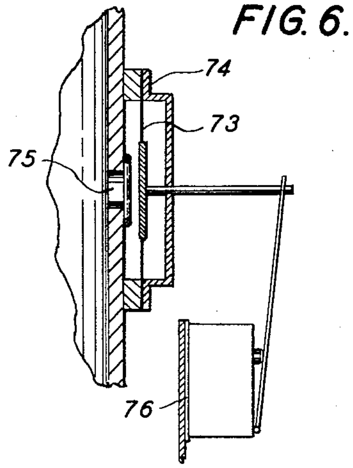
Figures 7, 8:
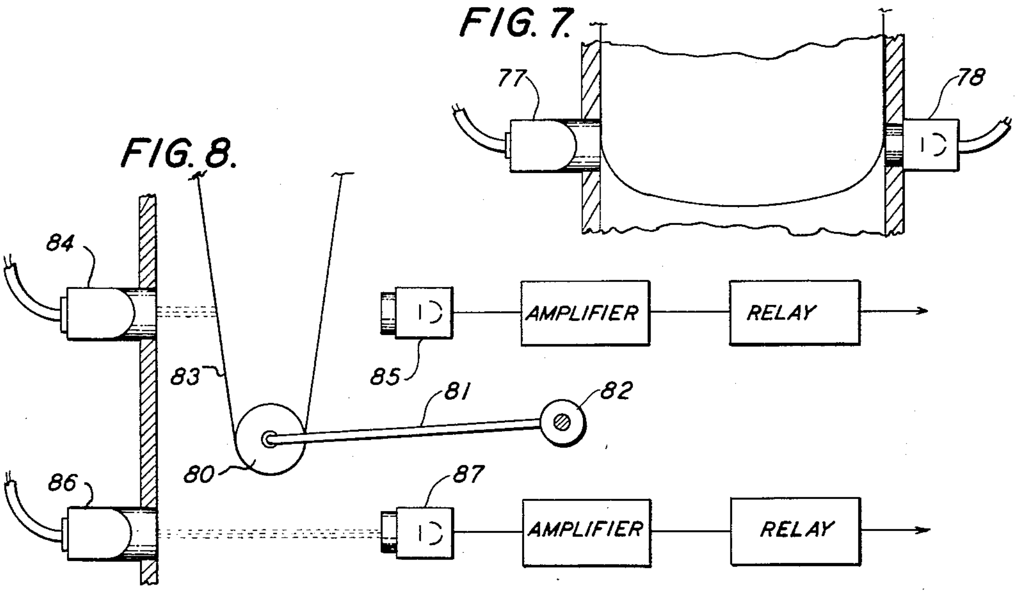
Figure 9:
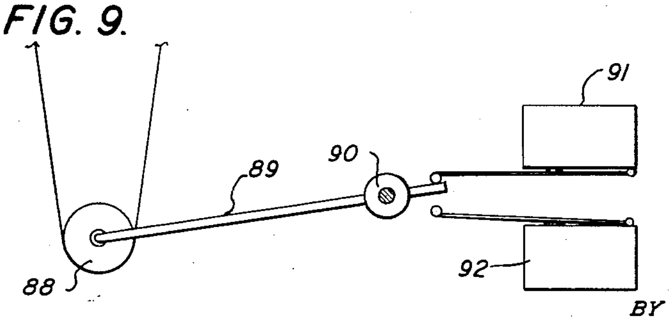

Figs. 5, 6, and 7 are elevational views of various sensing devices for use in connection with a vacuum column for determining slack loop length; and Figs. 8 and 9 are elevational views of apparatus for maintaining a slack loop.

Figure 1:
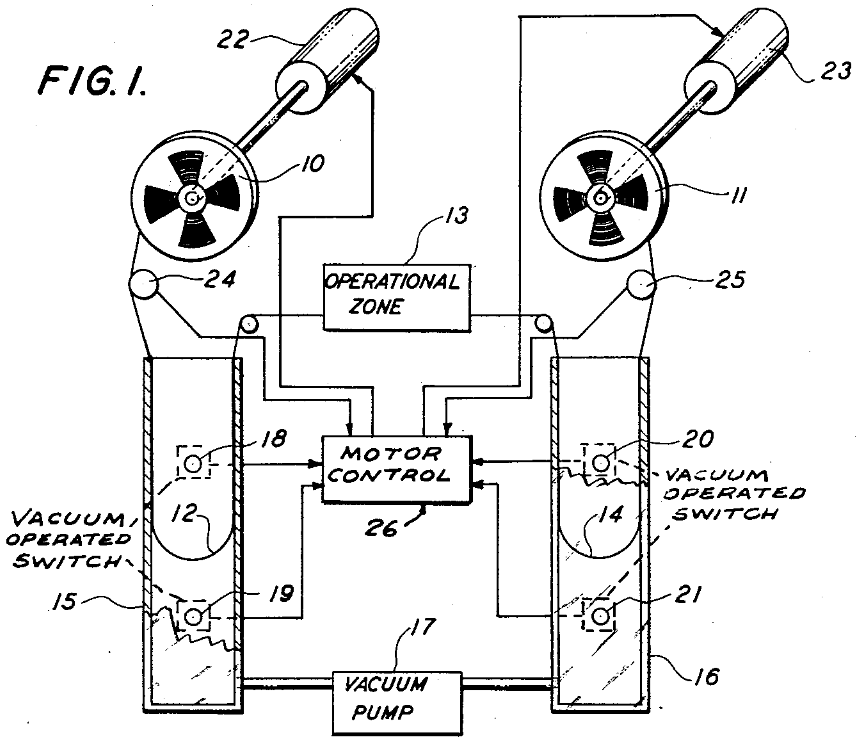
Fig. 1 is a simplified elevational view of a tape transport system adapted to operate in accordance with the present invention.

In Fig. 1, apparatus is shown for transporting tape from one reel to another reel, say from a supply reel 10 to a take-up reel 11. The tape passes via a supply reel slack loop 12 to an operational zone 13 in which may be located magnetic recording and reading heads when the tape transport system is used in connection with a magnetic recording system. The tape passes from the operational zone 13 to the take-up reel slack loop 14.

In the embodiment of Fig. 1, the slack loops 12 and 14 are positioned in vacuum columns 15 and 16 of rectangular cross section. To hold the loops in position, the region of the vacuum column below the slack loops 12 and 14 is slightly evacuated by a vacuum pump 17. In the case of a magnetic recording tape transport system, a pressure differential between the region above the slack loops and that below the slack loops corresponding to approximately eight inches of water, has been found satisfactory. For convenience in observing the length of the slack loops, the front face of the vacuum columns may be made of transparent material such as clear plastic or glass, as shown.

Signals may be derived which are indicative of the length of the slack loop 12 by means of the loop length sensors 18 and 19, which are located along the length of a vacuum column 15. In like manner, signals indicative of the length of the slack loop 14 may be derived from the loop length sensors 20 and 21 which are placed along the length of the vacuum column 16. As will be described in detail later, the signals derived from the loop length sensors are used to control the operation of the supply reel driving motor 22 and the take-up reel driving motor 23 by means of a motor control circuit 26.

In order to limit the travel of the tape so that in no event will it become disengaged from either of the reels, an end of tape sensor 24 is placed adjacent to the supply reel 10 and an end of tape sensor 25 is placed adjacent to the take-up reel 11. The end of tape sensors are adapted to provide an electrical signal when the end of the tape is approaching.

One suitable means for providing an end of tape sensor comprises a metal leader attached to the tape reel and to which is attached the tape. Where non-conductive tape is being transported, an electrical circuit may be completed between the metal leader and the end of tape sensor to provide an electrical signal.

Another method for sensing the end of a tape, described in the co-pending U.S. patent application in the name of Frederick S. McCormick, filed on January 20, 1955, S.N. 483,135 now Patent No. 2,815,907 and entitled Tape Transport System, includes a hollow shaft having an aperture against which the tape rides, and which is maintained at a slight vacuum. By means of perforations in the tape near to the end, the pressure changes in the hollow shaft when the perforated position of the tape passes the aperture. A vacuum switch connected to a point registers the change in pressure and gives an electrical indication when the end of tape is approaching. Of course, it will be appreciated that this method is primarily useful in systems wherein the tape being transported is not normally perforated, in contrast to systems in which the tape to be transported is punched to represent information.

In Fig. 1 the operational zone 13 includes means for driving the tape through the operational zone at a desired rate. Since the slack loops provide an effective buffer between the supply reel and the operational zone as well as between the take-up reel and the operational zone, rapid reversals, accelerations, and decelerations of the tape through the operational zone are possible without danger of breakage due to the inability of instantaneously altering the rate of direction of rotation of the reels.

Figure 2:
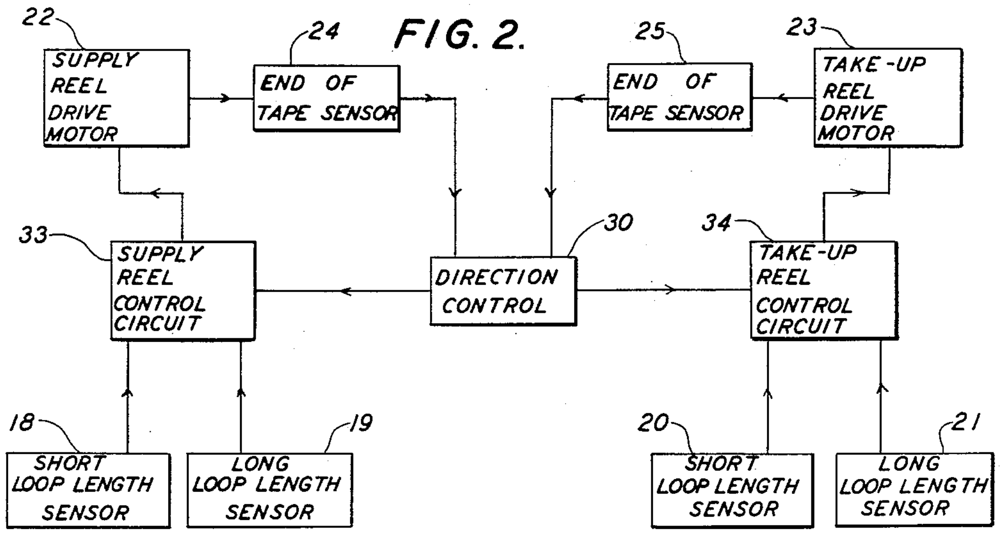
Fig. 2 is a block diagram of an embodiment of the invention.

A system for controlling the driving motors 22 and 23 of Fig. 1 in accordance with the signals provided by the loop length sensors 18, 19, 20 and 21, is shown in Fig. 2. Assuming that the direction control 30 of Fig. 2 is in the forward position in which tape is to be transported from the supply reel to the take-up reel, it will be appreciated that the supply reel need never wind the tape onto itself and the take-up reel need never unwind tape from itself.

With this in mind, the signals given by the supply loop length sensors 18 and 19 may be employed to determine whether the rate at which the supply reel is to be driven by the supply reel drive motor 22 is to be at a normal rate, at a faster than normal rate, or at a less than normal rate.

This is accomplished by the supply reel control circuit 33 which responds to the indications from the supply loop length sensors 18 and 19 and the indication from the direction control 30. For convenience the loop length sensor 18 of Fig. 1 may be termed the short loop length sensor and its indication that the slack loop length 12 is short, may be labeled S, while an indication that the supply loop length 12 is not too short may be labeled S'.

In like manner, the loop length sensor 19 of Fig. 1 may be termed a long loop length sensor, and an indication L indicates that the loop length is too long, while an indication L' indicates that the loop length is not too long.

Thus, the signals provided by the loop length sensors are L' and S' where the loop length falls between two predetermined limits, one of which is the predetermined limit beyond which the loop is short and the other is the predetermined limit beyond which the loop is long.

Referring to Fig. 2, the signals provided by the supply loop length sensors 18 and 19 may be $L+S'$, meaning that the loop is too long, $L'+S'$, meaning that the loop length is within the predetermined limits, and $L'+S$, meaning that the loop length is short.

The operation of the supply reel control circuit 33 in response to the signals from the supply loop length sensors 18 and 19 and the signals from the direction control 30, is shown in Fig. 3(*a*). When the direction control 30 is in the forward condition, and an $L+S'$ (long) indication is given, the supply reel control circuit 33 functions to brake softly the supply reel drive motor. When the indication $L'+S'$ (proper length loop) is given, the supply reel control circuit 33 functions to unwind slowly the supply reel at a rate corresponding to that at which the driving means in the operational zone 13 of Fig. 1 is transporting the tape.

When the indication from the supply loop length sensors 18 and 19 is $L'+S$ (short) the supply reel control circuit 33 causes the supply reel drive motor to unwind fast. Therefore, the supply reel control circuit 33 in response to the supply loop length sensors 18 and 19, tends to maintain the slack loop 12 of Fig. 1 between the limits set by the loop length sensors 18 and 19.

Another possible condition of the direction control 30 is that no tape is to be transported, and in this condition as shown in Fig. 3(*a*), the supply reel drive motor is driven to wind fast when the loop is long, to unwind fast when the loop is short, and to brake hard when the loop is within the predetermined limits defined by the loop length sensors.

Although for convenience one of the reels has been termed the supply reel, and the other the take-up reel, it will be appreciated that it is frequently desirable to pass tape from the take-up reel to the supply reel, and in this situation a reverse signal from the direction control 30 in Fig. 2, applied to the supply reel control circuit 33, modifies the action of the supply reel control circuit 33 in response to the signals given by the supply loop length sensors 18 and 19. In the reversed direction, when the loop length is long, the supply reel control circuit 33 functions to cause the supply reel drive motor to wind fast.

When the slack loop length is within the predetermined limits as indicated by a signal $L'+S'$, the supply reel drive motor winds slowly, at a rate corresponding to the rate of the tape passing the operational zone. In response to an indication that the slack loop length is short, the supply reel drive motor is softly braked.

Therefore, in each position of the direction control 30, forward, no transport, or reverse, the supply reel control circuit 33 acts in response to the signals from the supply loop length sensors 18 and 19 to maintain the length of the slack loop between the predetermined limits defined by the loop length sensors.

In a similar manner, the take-up reel control circuit 34 controls the operation of the take-up reel drive motor 23. The action of the take-up reel control circuit 34, in response to the signals provided by the take-up loop length sensors 20 and 21 and the signals from the direction control 30, is shown in Fig. 3(*b*).

In order to prevent the tape from being driven so far as to disengage itself from the reels, the end of tape sensors 24 and 25 of Fig. 1 are connected to the direction control 30. When an end of tape sensor provides a signal, the direction control 30 may be arranged to cause a reversal of transport or no transport.

The schematic circuit diagram of Fig. 4 corresponds to the supply reel control circuit 33 and the take-up reel control circuit 34. The diagram also includes the contact closures associated with the supply loop length sensors and take-up loop length sensors as well as the contact closures associated with the direction control.

The supply reel motor field coil 40 is connected between leads 41 and 42 which may be energized from a suitable source of potential (not shown). In like manner, the field coil 43 of the take-up reel drive motor is connected between the leads 41 and 42.

The armature 44 of the supply reel drive motor, which in combination with the field coil 40 comprises a conventional D.C. shunt motor, may be connected to drive the supply reel as indicated in the previous discussion of Figs. 2 and 3(*a*). Also, the armature 45 of the take-up reel drive motor, in combination with the field coil 43, comprises a conventional D.C. shunt motor which may be energized to drive the take-up reel as indicated in the previous discussion of Fig. 2 and Fig. 3(*b*).

The contact closures in Fig. 4 are shown in their prime position. That is, as shown, the forward contacts F and the reverse contacts R, are in position where tape movement is neither forward nor reverse, i.e., no transport. With respect to the loop length sensors, the contacts are in position where the loops are within the limits defined by the sensors, i.e., the loops are of proper length.

Referring to the diagram of Fig. 3(*a*) and Fig. 3(*b*), it will be seen that where the above contact positions obtain, the effect upon both the supply reel drive motor and the take-up reel drive motor is brake hard. In the circuit diagram of Fig. 4, the armature 44 of the supply reel drive motor is shorted through a set of closed contacts 46 associated with the short supply loop length sensor, a set of closed contacts 47 associated with the forward direction control, a set of closed contacts 48 associated with the reverse direction control, and a set of closed contacts 49 associated with the long supply loop length sensor.

As is well known, the shorting of the armature of a shunt D.C. motor results in a high torque being necessary to rotate the armature and hence provides a severe or hard braking action. The armature 45 of the take-up drive reel motor is likewise braked by virtue of the armature being shorted through a set of closed contacts 50 associated with the long take-up loop length sensor, a set of closed contacts 51 associated with the forward direction control, a set of closed contacts 52 associated with the reverse direction control, and a set of closed contacts 53 associated with the short take-up loop length sensor.

Assuming that the direction of transport is to be forward and referring to Fig. 4, the closed contacts 47 will open and the closed contacts 51 will open. However, a set of previously open contacts 54 associated with the forward direction control, will close, thereby completing a circuit from the lead 41 to the lead 42 via the armature 44 through the closed contacts 48, the closed contacts 49, and a resistor 55. Assuming that the loop length sensors indicate that the supply loop is of proper length, the current through the armature 44, as limited by the resistance 55, causes the armature 44 to rotate, thereby unwinding the supply reel. The value of the resistor 55 may be chosen to allow the armature 44 to rotate and unwind the tape at approximately the rate at which the tape is to be passed through the operational zone of Fig. 1.

In like manner, assuming the take-up loop length sensors indicate that the take-up loop is of proper length, and that the direction of tape transport is forward, a circuit is provided through the armature 45 via the closed contacts 52, the closed contacts 53, a resistor 56 and a set of contacts 57 associated with the forward control. This causes the armature 45 to rotate slowly and wind the take-up reel. The value of the resistor 56 may be selected so that the armature 45 rotates at a suitable speed in accordance with the rate at which the tape is to be passed through the operational zone of Fig. 1.

Again assuming that the direction of the tape transport is to be forward, when the indication given by the supply loop length sensors is that the loop is short, the contacts 46 will open and a set of contacts 58 associated with the short supply loop length sensor will close. This connects a resistor 59 in parallel with the resistor 55 and reduces the effective resistance in series with the armature 44, thereby causing the speed at which the armature rotates to increase. Thus, the requirement indicated in Fig. 3(*a*), that the supply reel unwind fast where the supply loop is short, is satisfied.

On the other hand, when the supply loop length is longer than the predetermined limit defined by the long loop length sensor, the contacts 49 will open and a set of contacts 60 associated with the long supply loop length sensor will close. When the contacts 47 are open, and the supply loop length is long, the armature 44 is thereby disconnected from the lead 41. However, the armature 44 is shorted through a resistor 61 connected serially with the contacts 60 and a resistor 55 connected serially with the contacts 54. By apportioning the values of the resistors 55 and 61, the load upon the armature 44 may be selected to result in a desired amount of braking action corresponding to the effect indicated in Fig. 3(*a*) as brake soft.

Again assuming that the direction of transport is to be forward and referring to the take-up reel drive motor, when the loop length sensors indicate that the take-up reel loop is longer than the predetermined limit defined by the long loop length sensor, the contacts 50 will open and a set of contacts 62 will close. This effectively places a resistor 63 in parallel with the resistor 56, thereby decreasing the resistance which is connected serially with the armature 45, which causes the armature 45 to be rotated to wind the take-up reel fast. On the other hand, when the take-up loop is shorter than the predetermined limit defined by the short take-up loop length sensors, the contacts 53 will open and a set of contacts 64 will close. Since the contacts 51 are open due to the transport being in the forward direction, the armature 45 is disconnected from the lead 42. However, the armature 45 is shorted via a resistor 65 connected serially with the contacts 64 and a resistor 56 connected serially with the contacts 57. The values of the resistors 65 and 56 may be selected to load the armature 45, thereby causing a brake soft action as indicated in Fig. 3(*b*).

When the direction of tape transport is reverse, and the loops are of proper length, a set of contacts 66 associated with the reverse direction control are closed, thereby connecting a resistor 67 serially with the armature 44, and the contacts 48 are opened. This causes the armature 44 to be energized via the contacts 47, the contacts 46, the resistor 67 and the contacts 66. The value of resistor 67 may be chosen to provide a desired rotational speed of the armature corresponding to the indication of Fig. 3(*a*) of wind slowly. If a faster reverse operation is desired, the value of the resistor 67 may be made smaller, thereby causing the armature 44 to rotate more rapidly.

When the loop associated with the supply reel is longer than the predetermined limit defined by the long supply loop length sensor, the contacts 49 open and the contacts 60 close, thereby connecting the resistor 67 and the resistor 61 in parallel, which causes the armature 44 to wind fast. On the other hand, when the supply reel loop is short, the contacts 46 open, the contacts 58 close, and the armature 44 is loaded through the resistances 59 and 67.

With respect to the take-up reel drive motor, when the direction of transport is reverse, the contacts 52 open and the contacts 68 close. Assuming that the loop is of proper length, current flows through the armature 45 via the resistance 69 which controls the rate of rotation of the armature. When the take-up reel loop is short, the contacts 64 close, the contacts 53 open, and the resistance 65 is connected in parallel with the resistance 69, thereby causing the armature 45 to rotate faster. On the other hand, when the loop length is long, the contacts 62 close, the contacts 50 open, and the armature 45 is loaded by the resistances 63 and 69.

Fig. 5 shows one suitable arrangement for providing a loop length sensor in a vacuum column. When the sensor is placed below the proper level of the loop in the vacuum column, the cup 70 is withdrawn against the tube 71, thereby actuating a microswitch 72 which includes a pair of normally open contacts and a pair of normally closed contacts as indicated in Fig. 4. When the loop length drops below the level of the tube 71, the pressure rises, thereby releasing the cup 70 which may be snapped outwardly by a spring if desired. The mode of operation of the sensor of Fig. 5, when placed above the proper level of the slack loop, is similar except that the normal prime position is with the cup 70 away from the tube 71. When the level of the slack loop rises above the level of the tube 71, the cup 70 is withdrawn against the tube 71 to actuate the microswitch 72.

An alternative arrangement for sensing the vacuum differential and hence the position of a slack loop in a vacuum column, is shown in Fig. 6 wherein a diaphragm 73 is stretched across a mounting ring 74 mounted on the wall of the vacuum column. When this arrangement is used as a long loop length sensor, the diaphragm is normally withdrawn towards the opening 75. When the loop length falls below the level of the opening 75, the diaphragm 73 moves away from the opening 75, thereby actuating the microswitch 76 which, as noted, may contain a pair of normally closed contacts and a pair of normally open contacts.

On the other hand, where the arrangement of Fig. 6 is used as a short loop length sensor, the diaphragm 73 remains in the position shown until such time as the level of the loop rises above the opening 75, and the vacuum below the loop withdraws the diaphragm 73 towards the opening 75, thereby actuating the microswitch 76.

Fig. 7 shows another arrangement for sensing the position of the slack loop in a vacuum column using a light source 77 and a photocell 78. When the loop is in the vacuum column as shown, the light is interrupted and does not reach the photocell. On the other hand, when the level of the loop rises above the level of the light, the photocell provides an electrical signal which may be amplified and used to actuate a relay having a pair of normally open contacts and a pair of normally closed contacts. Where the arrangement of Fig. 7 is used as a short loop length sensor, the normal condition is for the light to be interrupted, while where the sensor is used as a long loop length sensor, the normal condition indicating proper loop length is with the light striking the photocell.

Fig. 8 shows a mechanical arrangement which may be used in lieu of a vacuum column for maintaining slack loops in a tape transport system and for sensing the length of the slack loop. An idler pulley 80 is mounted on an arm 81 which is pivotally supported at 82. Due to the weight of the idler 80 or suitable springing, the tape 83 is held down in loop position. By placing a light 84 and a photocell 85 in one position as short loop length sensors, suitable signals may be derived via an amplifier and relay for actuating the motor control circuitry previously described. In like manner, a light 86 and a photocell 87 may be placed below the normal loop length position as a long loop length sensor.

In Fig. 9 another mechanical arrangement is shown for maintaining a slack loop in a tape transport system in which an idler pulley 88 is mounted to an arm 89 which in turn is pivotally supported at 90. By means of an extension on the arm, a pair of microswitches 91 and 92 may be actuated. The microswitch 91 provides a long loop length sensor which is actuated when the idler pulley 88 drops below a predetermined level, while the microswitch 92 forms a short loop length sensor which is actuated when the idler pulley 88 rises above a predetermined level.

One form of apparatus for accomplishing the functions of the direction control 30 of Fig. 2 may include a forward relay and a reverse relay, each of which has two sets of normally open contacts and two sets of normally closed contacts. These contacts are shown in the schematic circuit diagram of Fig. 4.

The relays may be energized manually from a suitable source of operating potential to place them in the forward transport position, the no transport position, or the reverse transport position. As previously noted, the end of tape sensors 24 and 25 of Fig. 1 may be connected to the direction control relays so as to reverse the direction of transport, or to cease transport upon an indication that the end of the tape is near to one of the end of tape sensors.

Although our invention has been successfully employed in a magnetic tape recording system forming a part of a temporary storage unit of a digital computer, it will be appreciated that the invention is not limited thereto, and may be used to advantage in any transport system in which a flexible material, such as tape, is to be moved past an operational zone, and in which it is necessary to provide for rapid accelerations, decelerations, and reversals of transport.

We claim:

1. In a tape transport system having a pair of motor driven reels with the tape wound on and extending between the reels, and reversible drive means engaging the tape at a point intermediate the two reels, apparatus for controlling the reel motors from a potential source to maintain a pair of slack loops in the tape on either side of the drive means of length within predetermined limits regardless of the direction of the drive means, said apparatus comprising means for sensing the length of one of said pair of tape loops including first and second switch-operating means positioned at spaced points along said one loop and actuated in response to the movement of the bight portion of the loop past the respective positions of the first and second switch-operating means, means for sensing the length of the other of said pair of tape loops including third and fourth switch-operating means positioned at spaced points along said other loop and actuated in response to the movement of the bight portion of the loop past the respective positions of the third and fourth switch-operating means, reversing switch means for changing the direction of rotation of the reel motors, means for selectively driving the motors at two different speeds, means for selectively braking the motors at two different rates, and circuit means interconnecting the loop sensing switches, the reversing switch, the drive speed selecting means, and the brake rate selecting means, the circuit means being adapted to operate the two motors at the slower of the two selectable speeds when the loops are respectively positioned intermediate the pairs of switches comprising the loop length sensing means, and further adapted to selectively brake and speed up the motors when the loops exceed the limits set by the loop length sensing means.

2. In a tape transport system having a pair of reels driven by motors having armatures and shunt fields, with the tape wound on and extending between the reels, and reversible drive means engaging the tape at a point intermediate the two reels, apparatus for controlling the reel motors from a potential source to maintain a pair of slack loops in the tape on either side of the drive means of length within predetermined limits regardless of the direction of the drive means, said apparatus comprising means for sensing the length of one of said pair of tape loops, including first and second switch means respectively responsive to movement of the bight portion of the first tape loop past two spaced positions with changes in the length of the loop, the armature of one reel motor being connected between the first and second switch means, means for sensing the length of the other of said pair of tape loops including third and fourth switch means respectively responsive to movement of the bight portion of the second tape loop past two spaced positions with changes in the length of the loop, the armature of the other reel motor being connected between the third and fourth switching means, reversing switch means for changing the direction of rotation of the tape drive, the reversing switch means including a stop condition, a forward condition, and a reverse condition, means including the reversing switch in the stop condition and the associated switching means for providing a short circuit path in shunt with the armatures of both motors when the tape loops are between the tape sensing positions, whereby the motors are braked hard in the stop condition with the loops between the sensing positions, means including the reversing switch in the stop position and the associated switching means for connecting each of the armatures across the potential source through a first series resistance when the tape loops are beyond the spaced sensing positions, whereby the motors are caused to rotate at a first speed determined by the first series resistance when the reversing switch is in the stop condition with the loops beyond the spaced sensing positions, means including the reversing switch in the forward and reverse conditions and the associated switching means for connecting each of the armatures across the potential source through a second series resistance when the tape loops are between the spaced sensing positions, whereby the motors are caused to rotate at a second speed slower than the first speed when the reversing switch is in the forward and reverse condition and the tape loops are between the tape sensing positions, means including the reversing switch in the forward and reverse conditions and the associated switching means for connecting the first and second resistances associated with each of the armatures in series across the respective armatures when the corresponding tape loops are positioned beyond one of the sensing positions, whereby the motors are caused to brake slowly, and means including the reversing switch in the forward and reverse conditions and said associated switching means for connecting the first and second resistances in parallel with each other and in series with the respective armatures across the potential source when the corresponding tape loops are positioned beyond the other of the sensing positions, whereby the motors are caused to rotate at a speed faster than said first speed.

3. In a tape transport system having a reel driven by a motor having an armature and a shunt field and drive means engaging the tape at a point spaced from the reel, apparatus for controlling the reel motor from a potential source to maintain a slack loop in the tape between the drive means and the reel of length within predetermined limits, said apparatus comprising means for sensing the length of the tape loop including first and second switching means respectively responsive to movement of the bight portion of the tape loop past two spaced positions with changes in the length of the loop, the armature of the shunt motor being connected between the first and second switching means, a control switch having a stop condition and a drive condition, means including the control switch and the first and second switching means for providing a short circuit path in shunt with the armature when the control switch is in the stop condition and the tape loop is between the space sensing position, whereby the motor is braked hard, means including the control switch in the stop condition and the first and second switching means for connecting each of the armatures across the potential source through a first series resistance when the loops are beyond the spaced sensing position, whereby the motor is caused to rotate at a first speed determined by the first series resistance, means including a control switch in the drive condition and the first and second switching means for connecting the armature across the potential source through a second series resistance when the tape loop is between the spaced sensing positions, whereby the motor is caused to rotate at a second speed slower than the first speed, means including the control switch in the drive condition and the first and second switching means for connecting the first and second resistances in series across the armature when the tape loop is positioned beyond one of the sensing positions, whereby the motor is braked slowly, and means including the control switch in the drive condition and the first and second switching means for connecting the first and second resistances in parallel with each other and in series with the armature across the potential source when the corresponding tape loops are positioned beyond the other of the sensing positions, whereby the motor is caused to rotate at a speed higher than said first speed.

References Cited in the file of this patent

UNITED STATES PATENTS

| | | |
|---|---|---|
| 2,292,511 | Ferm | Aug. 11, 1942 |
| 2,432,876 | Formhals et al. | Dec. 16, 1947 |
| 2,547,201 | Fegely | Apr. 3, 1951 |
| 2,792,217 | Weidenhammer et al. | May 14, 1957 |